(12) United States Patent
Onodera et al.

(10) Patent No.: US 10,780,623 B2
(45) Date of Patent: Sep. 22, 2020

(54) METHOD OF MANUFACTURING FOAM MOLDED ARTICLE

(71) Applicant: KYORAKU CO., LTD., Kyoto (JP)

(72) Inventors: Masaaki Onodera, Kanagawa (JP); Yoshinori Ono, Kanagawa (JP); Yu Igarashi, Kanagawa (JP)

(73) Assignee: KYORAKU CO., LTD., Kyoto (JP)

( * ) Notice: Subject to any disclaimer, the term of this patent is extended or adjusted under 35 U.S.C. 154(b) by 238 days.

(21) Appl. No.: 15/758,138

(22) PCT Filed: Sep. 28, 2016

(86) PCT No.: PCT/JP2016/078625
§ 371 (c)(1),
(2) Date: Mar. 7, 2018

(87) PCT Pub. No.: WO2017/057462
PCT Pub. Date: Apr. 6, 2017

(65) Prior Publication Data
US 2018/0243964 A1 Aug. 30, 2018

(30) Foreign Application Priority Data

Sep. 28, 2015 (JP) .................................. 2015-189801
Nov. 27, 2015 (JP) .................................. 2015-231469

(51) Int. Cl.
*B29C 49/04* (2006.01)
*B29C 44/10* (2006.01)
(Continued)

(52) U.S. Cl.
CPC ............ *B29C 49/04* (2013.01); *B29C 44/105* (2013.01); *B29C 49/18* (2013.01); *B29C 49/42* (2013.01);
(Continued)

(58) Field of Classification Search
CPC .......... B29C 2949/78563; B29C 2949/78588; B29C 2949/78756; B29C 2949/78764;
(Continued)

(56) References Cited

U.S. PATENT DOCUMENTS 4,968,242 A * 11/1990 Andersen ................ B29C 49/04
425/531
5,346,666 A *  9/1994 Kanoh .................... B29C 49/18
264/521
(Continued)

FOREIGN PATENT DOCUMENTS

JP          02092616 A  *  4/1990     ......... B29C 49/4802
JP       H04-323021 A     11/1992
(Continued)

OTHER PUBLICATIONS

Espacenet Translation of JP 11-286040 (Year: 1999).*
(Continued)

*Primary Examiner* — Xiao S Zhao
*Assistant Examiner* — John J Derusso
(74) *Attorney, Agent, or Firm* — Maier & Maier, PLLC

(57) ABSTRACT

A method of manufacturing a foam molded article is disclosed. The method includes the steps of extruding a molten, kneaded resin containing a foaming agent through an annular slit between a die core and a die shell, surrounding the die core to form a cylindrical foam parison, extruding the parison between a pair of split molds, pinching the parison between lower pinchers disposed under the split molds, and molding the parison by closing the split molds. H/D is 1.33 to 3.33 and L/D is 0.33 to 2.00, D being a die core diameter, H being a distance between a lower surface of the die core and an upper surface of each of the split molds, and L being a distance between a lower surface of each of the split molds (Continued)

and an upper surface of the corresponding lower pincher. The die core diameter is between 50 and 300 mm.

7 Claims, 18 Drawing Sheets

(51) Int. Cl.
  *B29C 49/78* (2006.01)
  *B29C 49/42* (2006.01)
  *B29C 49/58* (2006.01)
  *B29C 49/18* (2006.01)
  *B29K 105/04* (2006.01)
  *B29K 23/00* (2006.01)
  *B29L 31/30* (2006.01)

(52) U.S. Cl.
  CPC .......... *B29C 49/4252* (2013.01); *B29C 49/58* (2013.01); *B29C 49/78* (2013.01); *B29C 2049/044* (2013.01); *B29C 2949/78605* (2013.01); *B29K 2023/00* (2013.01); *B29K 2105/04* (2013.01); *B29L 2031/30* (2013.01)

(58) Field of Classification Search
  CPC .......... B29C 2949/78815; B29C 2949/78848; B29C 2049/4856; B29C 2049/4879
  See application file for complete search history.

(56) References Cited

U.S. PATENT DOCUMENTS

| | | | |
|---|---|---|---|
| 2011/0104414 A1 | 5/2011 | Onodera et al. | |
| 2012/0061886 A1* | 3/2012 | Sumi | B29C 51/00 264/571 |
| 2013/0052377 A1* | 2/2013 | Tani | F16L 43/02 428/34.1 |
| 2018/0009152 A1* | 1/2018 | Gomibuchi | B29C 33/20 |

FOREIGN PATENT DOCUMENTS

| | | | | |
|---|---|---|---|---|
| JP | H05-84811 A | | 4/1993 | |
| JP | H05-200844 A | | 8/1993 | |
| JP | 06190901 A | * | 7/1994 | ......... B29C 49/4802 |
| JP | H06-218801 A | | 8/1994 | |
| JP | H06-270242 A | | 9/1994 | |
| JP | 07214688 A | * | 8/1995 | ......... B29C 49/4802 |
| JP | H10-100236 A | | 4/1998 | |
| JP | 11286040 A | * | 10/1999 | |
| JP | 2000-043133 A | | 2/2000 | |
| JP | 2002-192601 A | | 7/2002 | |
| JP | 2006-305793 A | | 11/2006 | |
| JP | 2011051224 A | * | 3/2011 | ......... B29C 49/4802 |
| JP | 2011-116120 A | | 6/2011 | |
| JP | 2013028031 A | * | 2/2013 | ......... B29C 49/4802 |
| JP | 5953667 B2 | * | 7/2016 | ......... B29C 49/4802 |
| WO | 2016/098695 A1 | | 6/2016 | |

OTHER PUBLICATIONS

Espacenet Translation of JP 2002-192601 (Year: 2002).*
Espacenet Translation of JP 2011-51224 (Year: 2011).*
Espacenet Translation of JP 2013-28031 (Year: 2013).*
Extended European Search Report dated Jun. 21, 2018 of corresponding European application No. 16851633.4; 6 pgs.
Japanese Office Action dated Sep. 3, 2019, in connection with corresponding Japan Application No. 2015-231469; 10 pages.
International Search Report dated Dec. 13, 2016 of corresponding International application No. PCT/JP2016/078625; 5 pgs.
Extended European Search Report dated Jul. 22, 2019, of corresponding European application No. 19172468.1; 7 pgs.

* cited by examiner

SECTION A-A OR SECTION B-B

SECTION C—C

METHOD OF MANUFACTURING FOAM MOLDED ARTICLE

TECHNICAL FIELD

The present invention relates to a method of manufacturing a foam molded article.

BACKGROUND ART

For example, an air-conditioner for automobiles or the like uses a tubular air-conditioning duct for ventilation.

Foam molded articles formed of foam resins obtained by foaming thermoplastic resins using foaming agents are known to be used as air-conditioning ducts. Demands for foam molded articles are being increased, since they have both high heat insulation properties and light weight.

Widely known as a method of manufacturing such a foam molded article is foam blow molding, which involves closing split molds with respect to a molten foam resin and expanding the molten foam resin by blowing air thereinto.

The expansion ratios of foam molded articles have tended to be increased due to weight reduction requirements in recent years. However, an increase in the expansion rate is more likely to cause welding between portions of the outer surface of a foam parison to form a streak on the outer surface of the resulting foam molded article, that is, to cause a so-called "fold" phenomenon. Patent Literature 1 discloses a method that aims to suppress occurrence of a fold and involves closing a lower portion of a tubular foam parison and expanding the parison by blowing air into the parison before and/or while sandwiching the parison between molds.

CITATION LIST

Patent Literature

[Patent Literature 1] Japanese Unexamined Patent Application Publication No. 2002-192601

SUMMARY OF INVENTION

Technical Problem

However, the method of Patent Literature 1 requires blowing air into the parison before closing the molds and therefore complicates the manufacturing process.

The present invention has been made in view of the foregoing, and an object thereof is to provide a foam molded article manufacturing method that is able to suppress occurrence of a fold in a simple process.

Solution to Problem

The present invention provides a method of manufacturing a foam molded article. The method includes an extrusion step of extruding a molten, kneaded resin containing a foaming agent through an annular slit between a die core and a die shell surrounding the die core to form a cylindrical foam parison and extruding the foam parison between a pair of split molds, a lower-pinching step of pinching the foam parison between lower pinchers disposed under the split molds, and a molding step of molding the foam parison by closing the split molds, after the lower-pinching step. H/D is 1.33 to 3.33 and L/D is 0.33 to 2.00 where D represents a diameter of the die core; H represents a distance between a lower surface of the die core and an upper surface of each of the split molds; and L represents a distance between a lower surface of each of the split molds and an upper surface of the corresponding lower pincher.

Through experiments, the present inventors have found that occurrence of a fold can be suppressed by disposing a die core, split molds, and lower pinchers such that H/D is 1.33 to 3.33 and L/D is 0.33 to 2.00 where D represents the diameter of the die core; H represents the distance between the lower surface of the die core and the upper surface of each split mold; and L represents the distance between the lower surface of each split mold and the upper surface of the corresponding lower pincher, and completed the present invention.

Various embodiments of the present invention are described below. The embodiments below can be combined with each other.

Preferably, an expansion ratio of the foam molded article is 2.5 or more.

Preferably, the foam molded article is a tubular object including a main channel and a sub-channel connected to the main channel, and an angle between the main channel and the sub-channel is 45 to 90°.

Preferably, a section which forms an angle of 0 to 45° with an extrusion direction of the foam parison, of the foam molded article has a blow ratio of 0.5 to 0.8.

Preferably, the molding step includes a step of decompressing the split molds so that the foam parison is adsorbed by the split molds, and a start timing of decompression of one of the split molds is delayed by one sec or more compared to a start timing of decompression of the other split mold.

Preferably, the extraction step includes controlling a thickness of the foam parison so that an area where a fold is more likely to occur, of the foam parison has a smaller thickness than a thickness of another area of the foam parison.

Preferably, the extrusion step includes performing pre-blowing by injecting air toward an inner surface of the foam parison in a direction which forms an angle of 45° or more and 135° or less with a direction in which the molten, kneaded resin is extruded.

Preferably, the pre-blowing is performed using a pre-blow nozzle located over or under a region between the split molds.

Preferably, the foam parison is located in an approximately entire region between the split molds, then lower pinching is performed by pinching and sealing the foam parison, and then the pre-blowing is performed.

DESCRIPTION OF EMBODIMENTS

Figure 1:
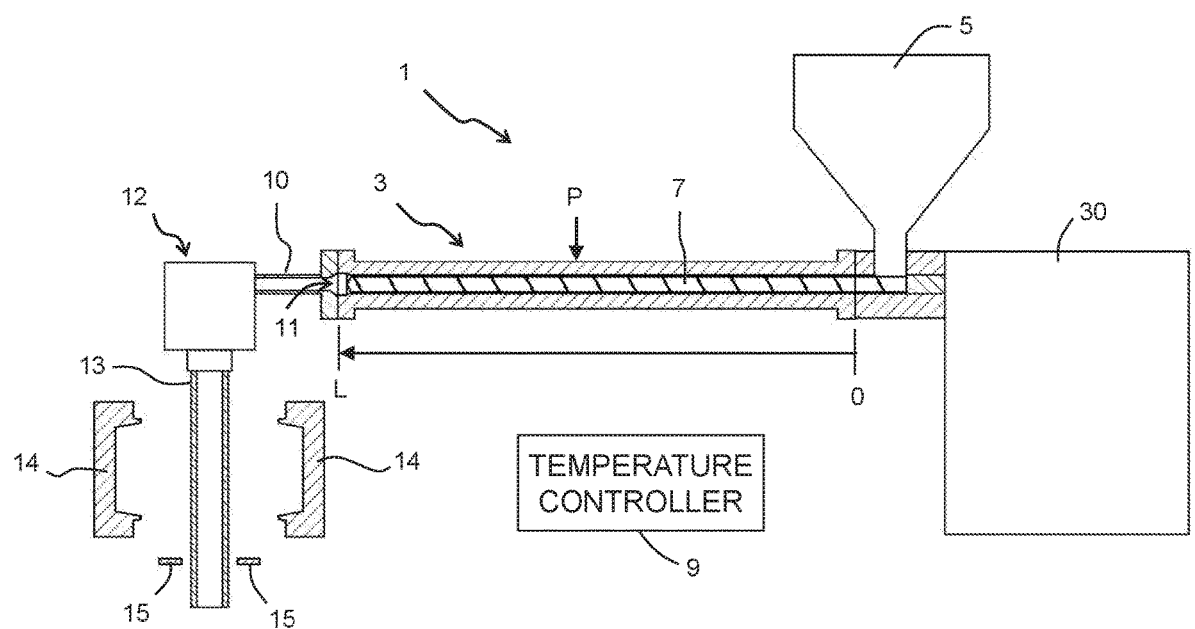
FIG. 1 shows the configuration of a foam molded article manufacturing apparatus according to a first embodiment of the present invention.

Now, embodiments of the present invention will be described. Various features described in the embodiments below can be combined with each other. Inventions are established for the respective features.

A first aspect of the present invention provides a method of manufacturing a foam molded article. The method includes an extrusion step of extruding a molten, kneaded resin containing a foaming agent through an annular slit between a die core and a die shell surrounding the die core to form a cylindrical foam parison and extruding the foam parison between a pair of split molds, a lower-pinching step of pinching the foam parison between lower pinchers disposed under the split molds, and a molding step of molding the foam parison by closing the split molds, after the lower-pinching step. H/D is 1.33 to 3.33 and L/D is 0.33 to 2.00 where D represents a diameter of the die core; H represents a distance between a lower surface of the die core and an upper surface of each of the split molds; and L represents a distance between a lower surface of each of the split molds and an upper surface of the corresponding lower pincher.

A second aspect of the present invention provides a method of manufacturing a foam molded article. The method includes a parison formation step of forming a foam parison by extruding a molten, kneaded resin containing a foaming agent through an annular slit in an extrusion direction in which a molding region between a pair of split molds lies, a molding step of molding a foam molded article by closing the split molds with respect to the foam parison located in the molding region. The parison formation step includes performing pre-blowing by injecting air toward an inner surface of the foam parison in a direction which forms an angle of 45° or more and 135° or less with the extrusion direction.

1. First Embodiment

First, there will be described a foam molded article manufacturing apparatus suitable to perform a foam molded article manufacturing method according to a first embodiment of the present invention. Then, the foam molded article manufacturing method according to the first embodiment will be described.

1.1 Foam Molded Article Manufacturing Apparatus

As shown in FIGS. 1 to 5, the foam molded article manufacturing apparatus according to the first embodiment of the present invention includes a foam extruder 1, split molds 14, and lower pinchers 15. The foam extruder 1 includes a cylinder 3, a resin inlet 5, a screw 7, a foaming agent inlet P, a temperature controller 9, a resin extrusion outlet 11, and a die head 12.

The respective elements will be described in detail below.

Resin Inlet 5

The resin inlet 5 is a so-called "hopper", and a raw-material resin is introduced therethrough. The raw-material resin may be in any form and is typically in the form of pellets. The raw-material resin is, for example, a thermoplastic resin such as polyolefin. Examples of polyolefin include low-density polyethylene, linear low-density polyethylene, high-density polyethylene, polypropylene, ethylene-propylene copolymer, and mixtures thereof. After being introduced to the cylinder 3 through the resin inlet 5, the raw-material resin is heated and thus molten in the cylinder 3 to give a molten resin. The molten resin is transferred toward the resin extrusion outlet 11 disposed at one end of the cylinder 3 by the rotation of the screw 7 disposed in the cylinder 3.

Screw 7

The screw 7 is disposed in the cylinder 3 and transfers the molten resin toward the resin extrusion outlet 11 by the rotation thereof while kneading the molten resin. The screw 7 is provided with a gear device 30 at one end thereof and is rotationally driven by the gear device 30. The number of screws 7 disposed in the cylinder 3 may be one, or two or more.

Foaming Agent Inlet P

The cylinder 3 is provided with the foaming agent inlet P for introducing a foaming agent to the cylinder 3. The foaming agent inlet P may be disposed in any position. However, the foaming agent inlet P is preferably disposed in a position represented by 0.3 L to 0.7 L (preferably 0.4 L to 0.6 L) where 0 represents the position of the end close to the resin inlet 5, of the cylinder 3; and L represents the position of the end close to the resin extrusion outlet 11 thereof. If the foaming agent inlet P is disposed in a position closer to the resin inlet 5 than a position represented by 0.3 L, the foaming agent may be introduced with the molten resin insufficiently kneaded, resulting in insufficient dispersion of the foaming agent. On the other hand, if the foaming agent inlet P is disposed in a position closer to the resin extrusion outlet 11 than a position represented by 0.7 L, the temperature of the molten resin may become excessively low in the area in which the foaming agent is introduced, resulting in introduction of a smaller amount of foaming agent. This is because the temperature of the molten resin is typically controlled so as to gradually decrease toward the resin extrusion outlet 11.

Examples of the foaming agent introduced through the foaming agent inlet P include physical foaming agents, chemical foaming agents, and mixtures thereof. Examples of physical foaming agents include inorganic physical foaming agents such as air, carbon dioxide, nitrogen gas, and water, organic physical foaming agents such as butane, pentane, hexane, dichloromethane, and dichloroethane, and super-critical fluids thereof. A supercritical fluid is preferably prepared using carbon dioxide, nitrogen, or the like. If nitrogen is used, a supercritical fluid is prepared by setting the critical temperature to −149.1° C. and the critical pressure to 3.4 MPa or more; if carbon dioxide is used, a supercritical fluid is prepared by setting the critical temperature to 31° C. and the critical pressure to 7.4 MPa or more. Examples of chemical foaming agents include ones that generate carbon dioxide by chemical reaction between acid (e.g., citric acid or salt thereof) and base (e.g., sodium bicarbonate). A chemical foaming agent may be introduced through the resin inlet 5 rather than the foaming agent inlet P.

Temperature Controller 9

The temperature controller 9 is configured to control the temperatures of the respective portions of the cylinder 3 by individually controlling multiple temperature controlling units disposed along the cylinder 3. The temperature controller 9 is also able to control the temperature of the die head 12 for forming a foam parison 13 and the temperature of a coupler 10 between the cylinder 3 and die head 12.

Resin Extrusion Outlet 11 and Die Head 12

Figure 2:
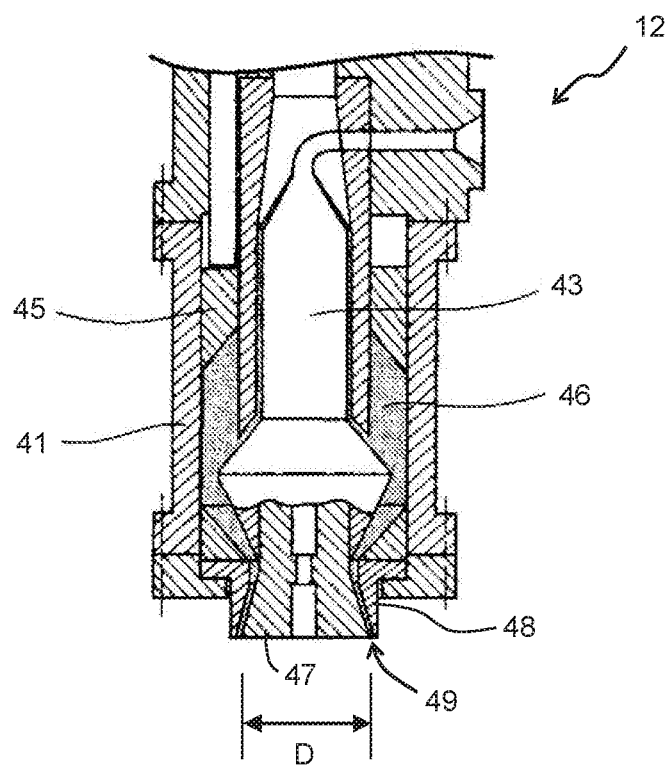
FIG. 2 is a sectional view of a die head 12 in FIG. 1.

A molten, kneaded resin obtained by melting and kneading the raw-material resin and foaming agent is extruded through the resin extrusion outlet 11 and introduced to the die head 12 through the coupler 10. As shown in FIG. 2, the die head 12 includes a cylindrical die case 41 and a mandrel 43 contained therein. The molten, kneaded resin extruded from the cylinder 3 is reserved in the space 46 between the die case 41 and mandrel 43. The front end of the die head 12 is provided with a die core 47 and a die shell 48 surrounding the die core 47, and an annular slit 49 is provided therebetween. By reserving the molten, kneaded resin in a predetermined amount in the space 46 and then vertically pressing down a ring-shaped piston 45, the molten, kneaded resin is extruded through the annular slit 49 to form a cylindrical foam parison 13. The foam parison 13 is extruded between the pair of split molds 14.

Split Molds 14 and Lower Pinchers 15

Figure 3:
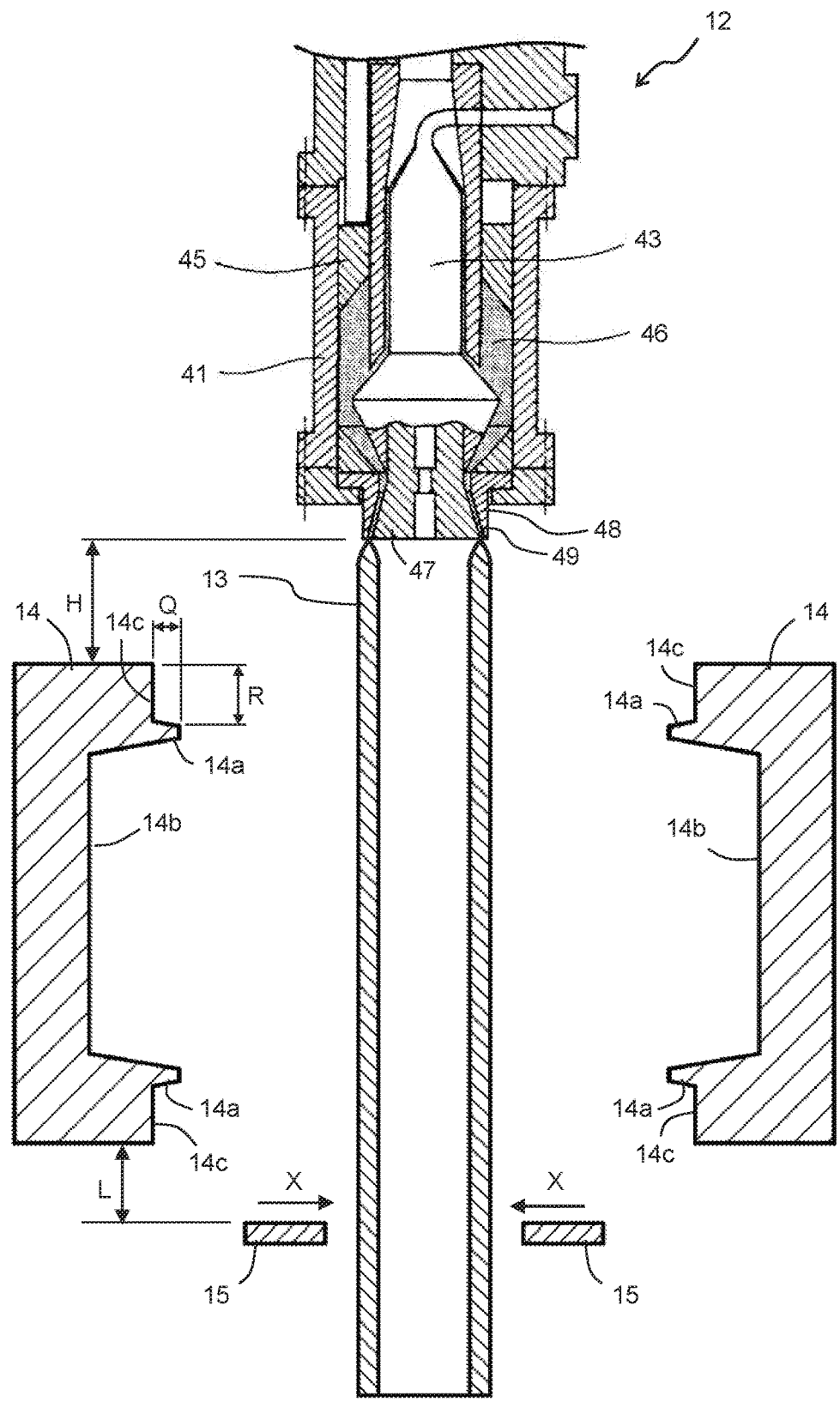
FIG. 3 is a sectional view of the die head 12, split molds 14, lower pinchers 15, and vicinities thereof in FIG. 1.

The pair of split molds 14 are used to mold the foam parison 13 into a foam molded article. As shown in FIG. 3, the split molds 14 are provided with pinch-off parts 14a surrounding cavities 14b. The split molds 14 are also provided with flash escape parts 14c surrounding the pinch-off parts 14a. The area pinched between the pinch-off parts 14a, of the foam parison 13 forms a parting line PL shown in FIG. 6B, and the portion outside the pinch-off parts 14a, of the foam parison 13 forms flash. The distance R from the upper surface to the pinch-off part 14a of each split mold 14 is, for example, 50 mm. The height Q of each pinch-off part 14a seen from the corresponding flash escape part 14c is, for example, 5 to 10 mm.

Figure 4:
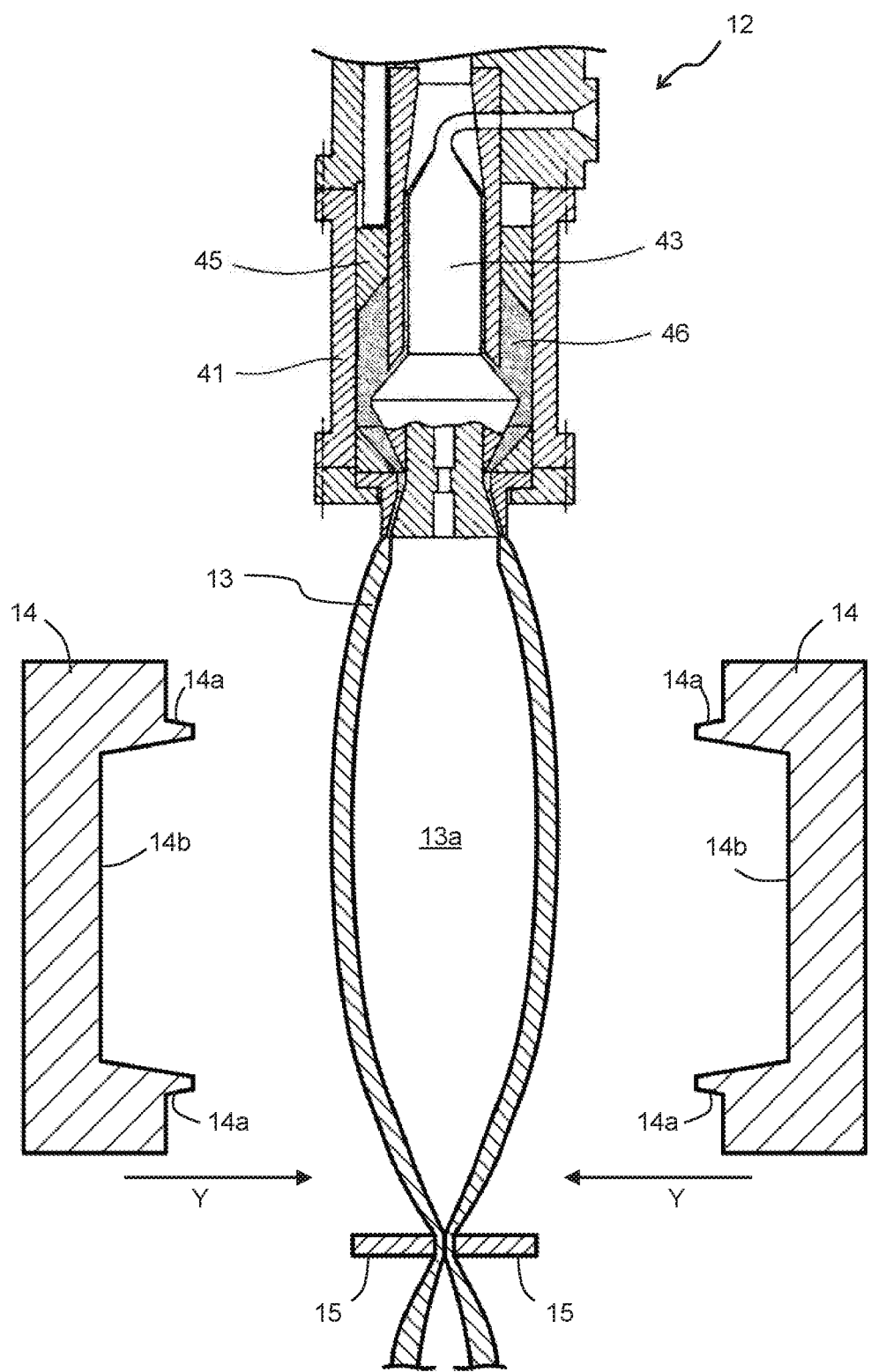
FIG. 4 is a sectional view showing a state in which a foam parison 13 has been pinched between the lower pinchers 15 from a state in FIG. 3.

The foam parison 13 may be molded using any molding method that uses the split molds 14. For example, blow molding, which involves molding the foam parison 13 by blowing air into the cavities of the split molds 14, vacuum molding, which involves molding the foam parison 13 by decompressing the cavities of the split molds 14 from the inner surfaces of the cavities, or a combination thereof may be used. As shown in FIGS. 3 and 4, the lower pinchers 15 are used to pinch a lower portion of the foam parison 13 (hereafter referred to as "lower-pinching") to form a closed space 13a in the foam parison 13. After the lower-pinching, the split molds 14 are closed.

As shown in FIGS. 2 and 3, the split molds 14 are disposed such that (the distance H between the lower surface of the die core 47 and the upper surface of each split mold 14)/(the diameter D of the die core 47) is 1.33 to 3.33. The lower pinchers 15 are disposed such that (the distance L between the lower surface of each split mold 14 and the upper surface of the corresponding lower pincher 15)/(the diameter D of the die core 47) is 0.33 to 2.00. If the value of H/D or L/D is too small, the internal pressure of the closed space 13a of the foam parison 13 may be excessively increased during closing of the split molds 14 following the lower-pinching, resulting in rupture of the foam parison 13. If the value of H/D or L/D is too large, the internal pressure of the closed space 13a of the foam parison 13 in the cavities 14b would not be sufficiently increased during closing of the split molds 14 following the lower-pinching. Consequently, the difference between the shape of the foam parison 13 in the cavities 14b after closing the molds and the shape of a foam molded article as an end product would be increased, making a fold more likely to occur. Specifically, H/D may be, for example, 1.33, 1.50, 2.00, 2.50, 3.00, or 3.33, or may be between any two of the values presented. Specifically, L/D may be, for example, 0.33, 0.50, 1.00, 1.50, or 2.00, or may be between any two of the values presented. D is 50 to 300 mm. Specifically, D is, for example, 50, 100, 150, 200, 250, or 300 mm, or may be between any two of the values presented.

2. Foam Molded Article Manufacturing Method

The foam molded article manufacturing method according to the first embodiment of the present invention includes an extrusion step, a lower-pinching step, and a molding step.

As shown in FIG. 3, the extrusion step involves extruding the molten, kneaded resin containing the foaming agent from the annular slit 49 between the die core 47 and the die shell 48 surrounding the die core 47 to form a cylindrical foam parison 13, and extruding the foam parison 13 between the pair of split molds 14. In the extrusion step, the split molds 14 and lower pinchers 15 are open.

As shown in FIGS. 3 and 4, the lower-pinching step involves pinching the foam parison 13 between the lower pinchers 15 disposed under the split molds 14. Specifically, the lower pinchers 15 are moved in the directions of arrows X in FIG. 3 so that the foam parison 13 is placed in a lower-pinching state shown in FIG. 4. Thus, a closed space 13a is formed in the foam parison 13.

Figure 5:
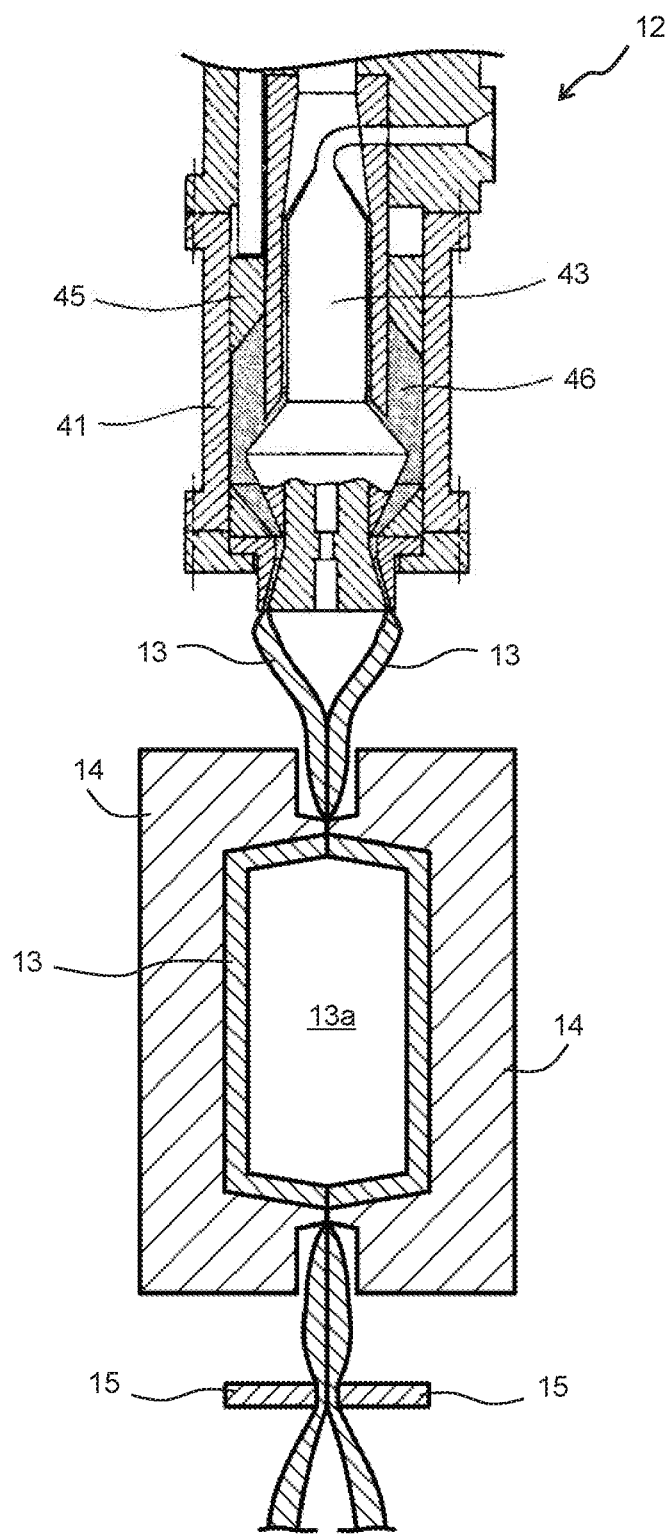
FIG. 5 is a sectional view showing a state in which the split molds 14 have been closed from the state in FIG. 4.

As shown in FIGS. 4 and 5, the molding step following the lower-pinching step involves molding the foam parison 13 by closing the split molds 14. Specifically, the split molds 14 are closed by moving the split molds 14 in the directions of arrows Y in FIG. 4. The foam parison 13 may be molded by blow molding, vacuum molding, or a combination thereof. In the first embodiment, (the distance H between the lower surface of the die core 47 and the upper surface of each split mold 14)/(the diameter D of the die core 47) is 1.33 to 3.33, and (the distance L between the lower surface of each split mold 14 and the upper surface of the corresponding lower pincher 15)/(the diameter D of the die core 47) is 0.33 to 2.00. Thus, rupture of the foam parison 13 is suppressed while the molds are closed, and occurrence of a fold is suppressed while the foam parison 13 is molded.

If the method includes a step of decompressing the split molds 14 so that the foam parison 13 is adsorbed by the split molds 14, the start timing of decompression of one split mold 14 is preferably delayed by one sec or more (e.g., 1 to 5 sec) compared to the start timing of decompression of the other split mold 14. In particular, it is preferred to delay the start timing of decompression of the split mold 14 in which a fold is more likely to occur. For example, if the decompression of the right split mold 14 is started first, the foam parison 13 present in the cavities 14b is moved to the right, and the gap between the left split mold 14 and the foam parison 13 is increased. If the decompression of the left split mold 14 is started in this state, the foam parison 13 is expanded in a larger space. Thus, the wrinkles of the foam parison 13 are more likely to be stretched, and a fold is less likely to occur. Accordingly, if a fold is more likely to occur on a left portion of the foam parison 13, it is desirable to first start the decompression of the right split mold 14. Conversely, if a fold is more likely to occur on a right portion of the foam parison 13, it is desirable to first start the decompression of the left split mold 14.

Figure 6A:
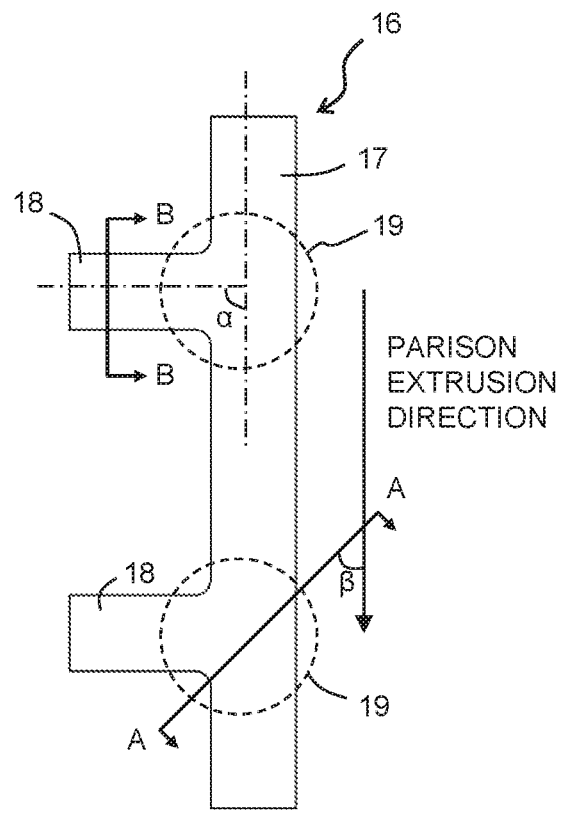
FIG. 6A is a plan view showing the configuration of a foam molded article 16 to which the present invention is suitably applied.

In the extrusion step, it is preferred to control the thickness of the foam parison 13 so that the thickness T1 of the area where a fold is more likely to occur, of the foam parison 13 becomes smaller than the thickness T2 of another area of the foam parison 13. T1/T2 is preferably 0.8 to 0.9. Thus, the area where a fold is more likely to occur, of the foam parison 13 is easily stretched, resulting in suppression of a fold. If the foam molded article is a tubular object including a main channel 17 and sub-channels 18 connected to the main channel 17, as shown in FIG. 6A, a fold is more likely to occur on the junctions 19 between the main channel 17 and sub-channels 18. Accordingly, it is preferred to reduce the thicknesses of areas corresponding to the junctions 19, of the foam parison 13.

3. Foam Molded Article

The foam molded article manufacturing method of the first embodiment is a method that can be suitably used to manufacture a foam molded article having any shape and expansion ratio and that effectively suppresses occurrence of a fold. For this reason, this method is particularly suitable to manufacture a foam molded article having a shape or expansion ratio which makes a fold more likely to occur.

In this respect, the expansion ratio of the foam molded article is preferably 2.5 or more. The reason is that higher expansion ratios result in greater reductions in the strength of the foam parison 13, making wrinkles and thus a fold more likely to occur on the foam parison 13. The upper limit of the expansion ratio may be any value and is, for example, 5. Specifically, the expansion ratio is, for example, 2.5, 3, 3.5, 4, 4.5, or 5, or may be between any two of the values presented. The average thickness of the foam molded article is preferably 2 mm or more. The reason is that if the same amount of resin is used, greater average thicknesses result in greater increases in the expansion ratio and greater reductions in the strength of the foam parison 13, making a fold more likely to occur. The upper limit of the average thickness may be any value and is, for example, 6 mm. Specifically, the average thickness is, for example, 2, 2.5, 3, 3.5, 4, 4.5, 5, 5.5, or 6 mm, or may be between any two of the values presented.

As shown in FIG. 6A, a foam molded article 16 is, for example, a tubular object including the main channel 17 and sub-channels 18 connected to the main channel 17. The angle α between the main channel 17 and each sub-channel 18 is preferably 45 to 90°. In an example in FIG. 6A, the angle α is 90°. The foam molded article 16 having such a shape is more likely to make a fold on the junctions 19 between the main channel 17 and sub-channels 18. While the sub-channels 18 are divergent channels in FIG. 6A, they may be approximately L-shaped bent channels.

Figure 6B:
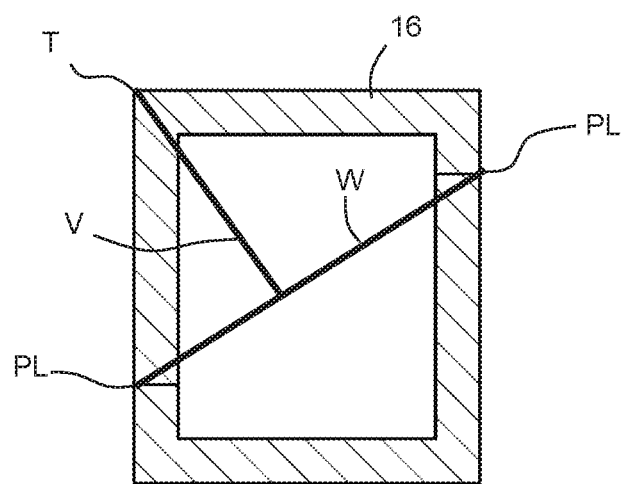
FIG. 6B shows a section A-A or section B-B in FIG. 6A.

A section S which forms an angle β of 0 to 45° with the extrusion direction of the foam parison 13 preferably has a blow ratio of 0.5 to 0.8. In FIG. 6A, a section A-A forms an angle β of 45°, and a section B-B forms an angle β of 0°. The section S is preferably a section of a sub-channel 18 or junction 19, more preferably a section of a junction 19. The reason is that by calculating the blow ratio of a section of such a part, the prediction accuracy of likelihood of the occurrence of a fold can be increased. The blow ratio is calculated using the following method: first, as shown in FIG. 6B, the outermost points of opposed parting lines are connected using a straight line W in the section S; next, a point T which is most distant from the straight line W, and the straight line W are connected using a straight line V in the section S; and then, the blow ratio is calculated in accordance with a formula, the blow ratio=(the length of the straight line V)/(the length of the straight line W). Specifically, the blow ratio is, for example, 0.5, 0.6, 0.7, or 0.8, or may be between any two of the values presented.

EXAMPLES

Foam molded articles were manufactured using the foam molded article manufacturing apparatus shown in FIG. 1 and evaluated on whether a fold is present. The inner diameter of the cylinder 3 of the foam extruder 1 was 50 mm, and L/D of the screw of the extruder was 34. Used as a raw-material resin was one obtained by mixing LDPE (grade: G201-F available from Sumitomo Chemical Company, Limited) and HDPE (grade: B470 available from Asahi Kasei Corporation) at a mass ratio of 1:1. The temperature controller 9 was set such that the temperature of the foam parison 13 becomes 190 to 200° C. The number of revolutions of the screw 7 was set to 60 rmm, and the extrusion rate was set to 20 kg/hr. N2 gas was introduced as a foaming agent through the foaming agent inlet P disposed in a position represented by 0.5 L. The expansion ratio was adjusted by changing the amount of gas to be introduced. The diameter of the die core 47 was set to 150 mm.

Foam parisons formed under the above conditions were blow-molded into foam molded articles having a shape shown in FIG. 6A under conditions shown in Table 1, and the obtained foam molded articles were evaluated on whether a fold had occurred thereon.

As shown in Table 1, folds were formed on Samples Nos. 3 to 8 and 11 to 16. Any of the folds was formed on the junction 19 so as to extend in a direction which forms an angle β of 0 to 45° with the extrusion direction of the foam parison 13. Also, the blow ratio of a section along the direction in which each fold extends was calculated. As shown in Table 1, it was found that a fold is more likely to occur in positions where the blow ratio is 0.5 to 0.8.

No fold was formed on Samples Nos. 1, 2, 9, and 10 having H/D of 1.33 to 3.33 and L/D of 0.33 to 2.00, regardless of the blow ratio.

Based on these results, it was found that by setting H/D to 1.33 to 3.33 and L/D to 0.33 to 2.00, even a foam molded article having an expansion ratio of 2.5 or more and a blow ratio of the junction 19 of 0.5 to 0.8 can prevent occurrence of a fold. Note that Samples having expansion ratios of 2 or less made no fold even if H/D and L/D fall outside the ranges.

TABLE 1

| | | | | | Whether a fold is present | | |
|---|---|---|---|---|---|---|---|
| Sample No. | Expansion rate | Average thickness | H/D | L/D | Blow ratio 0.5-0.6 | Blow ratio 0.6-0.7 | Blow ratio 0.7-0.8 |
| 1 | 3 | 4 mm | 1.33 | 0.33 | | | |
| 2 | 3 | 4 mm | 3.33 | 2.00 | | | |
| 3 | 3 | 4 mm | 1.00 | 0.33 | | Present | Present |
| 4 | 3 | 4 mm | 1.33 | 0.20 | | | Present |
| 5 | 3 | 4 mm | 1.00 | 0.20 | Present | Present | Present |

TABLE 1-continued

| | | | | | Whether a fold is present | | |
|---|---|---|---|---|---|---|---|
| Sample No. | Expansion rate | Average thickness | H/D | L/D | Blow ratio 0.5-0.6 | Blow ratio 0.6-0.7 | Blow ratio 0.7-0.8 |
| 6 | 3 | 4 mm | 4.00 | 2.00 | | | Present |
| 7 | 3 | 4 mm | 3.33 | 2.33 | | Present | Present |
| 8 | 3 | 4 mm | 4.00 | 2.33 | Present | Present | Present |
| 9 | 2.5 | 2 mm | 1.33 | 0.33 | | | |
| 10 | 2.5 | 2 mm | 3.33 | 2.00 | | | |
| 11 | 2.5 | 2 mm | 1.00 | 0.33 | | | Present |
| 12 | 2.5 | 2 mm | 1.33 | 0.20 | | | Present |
| 13 | 2.5 | 2 mm | 1.00 | 0.20 | | Present | Present |
| 14 | 2.5 | 2 mm | 4.00 | 2.00 | | | Present |
| 15 | 2.5 | 2 mm | 3.33 | 2.33 | | | Present |
| 16 | 2.5 | 2 mm | 4.00 | 2.33 | | Present | Present |

2. Second Embodiment

Figure 7A:
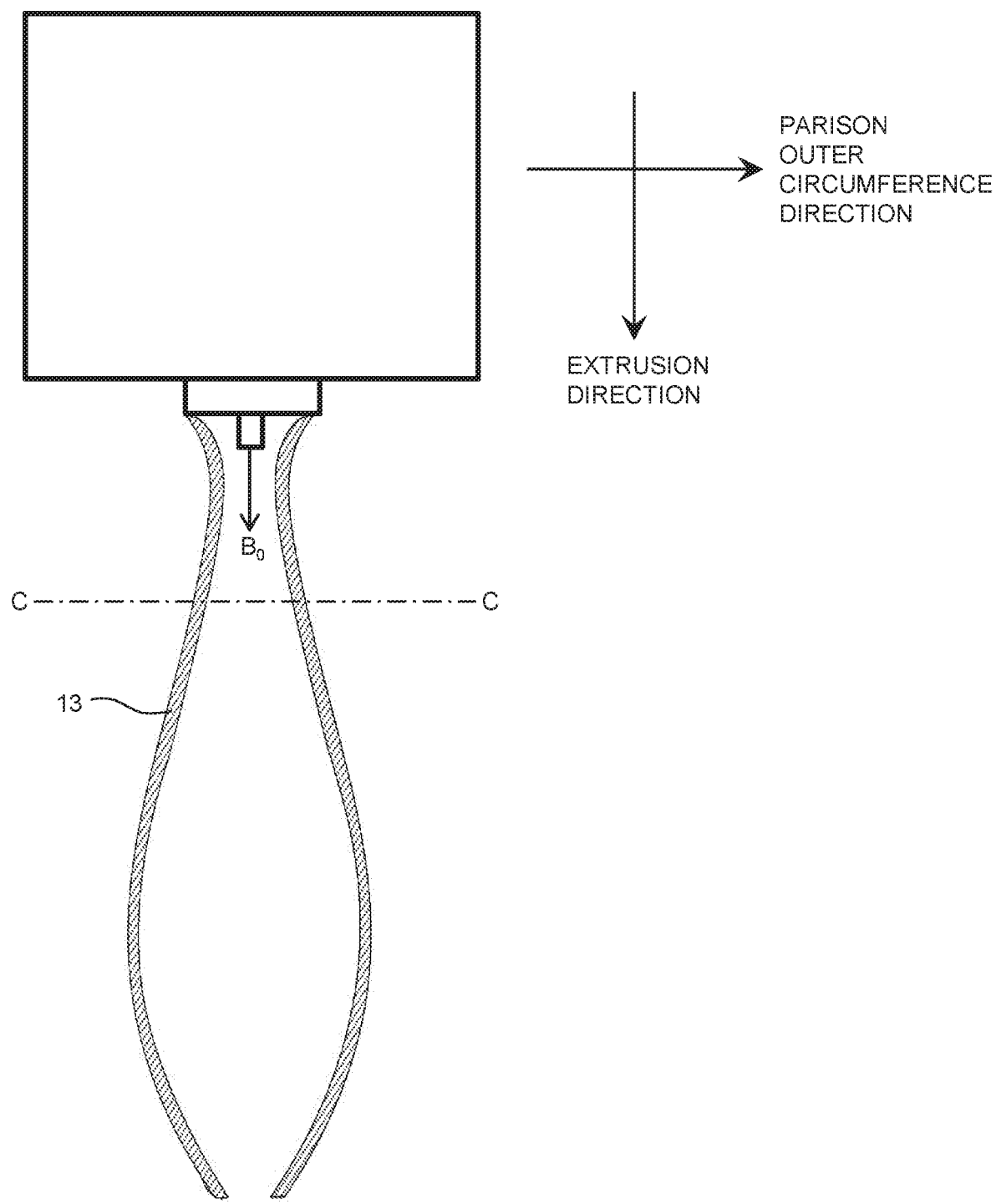
FIG. 7A is a drawing showing the shrinkage of the shape of the parison.

The foam molded article manufacturing apparatus and method according to the first embodiment may perform pre-blowing by injecting air in the direction of an arrow $B_0$ (extrusion direction) using a pre-blow nozzle, as shown in FIG. 7A, although such a case has not been described in the first embodiment. However, foam blow molding including such pre-blowing has the following problems.
(1) As shown in FIG. 7A, air flow occurs inside the parison, and ambient air is attracted (Coanda effect). Thus, a negative pressure tends to be formed inside the parison, in particular, around the pre-blow nozzle, resulting in shrinkage of the shape of the parison into a gourd shape.
(2) The melt tension of a thermoplastic resin in foam blow molding is lower than that in typical blow molding, and a foam parison is stretched in the direction of gravity (typically, in the extrusion direction) due to the effect of gravity. As a result, the parison diameter is reduced.

Figure 7B:
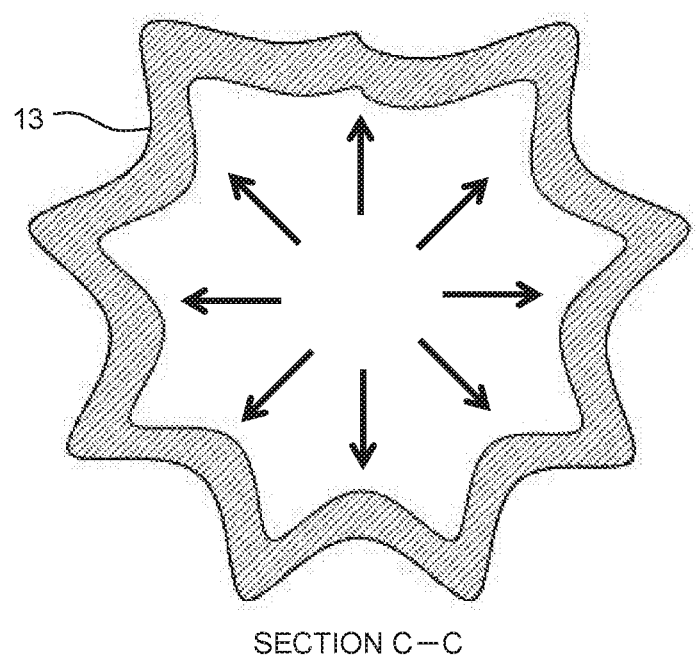
FIG. 7B is a drawing showing a fold problem (curtain phenomenon) in a section C-C in FIG. 7A.

To solve these problems, the foam molded article manufacturing apparatus and method according to the second embodiment have an ingenious idea that allows for the formation of a foam parison into an approximately cylindrical shape without shrinking it and allows for the ease of reduction of the parison diameter. Also, this ingenious idea has been found to allow for a greater reduction in the incidence of a fold (in particular, a curtain phenomenon shown in FIG. 7B) than that in the first embodiment. These will be described in detail below. The elements common to the first and second embodiments will not be described.
2.1 Pre-Blow Nozzle 20

In the second embodiment and later, the region between split molds 14 is defined as a molding region U for the convenience of description. A pre-blow nozzle 20 has multiple micropores (not shown) in the side surface thereof, and air is injected through the micropores. The micropores may have any shapes and may have, for example, circular or oval shapes, or polygonal shapes such as quadrangular shapes. If the micropores are circular, the diameter of one micropore is preferably about 0.3 mm to 40.0 mm, more preferably 3.0 mm. If the diameter is smaller than the above range, the effect of expanding a foam parison 13 by pre-blowing would not be sufficiently obtained. Also, in case a resin adheres to the micropores, the micropores may be blocked. On the other hand, if the diameter is larger than the above range, processing itself is difficult (is limited by the size of the die core 47), and the resin may flow into the micropores. Although the number of micropores depends on the diameters thereof, it is preferably 3 to 8, more preferably 4.

As shown in FIGS. 8 to 11, after a resin extrusion step (see FIG. 8) and a lower-pinching step (FIG. 9), pre-blowing is performed by injecting air from the pre-blow nozzle 20 toward the inner surface of the foam parison 13 in a direction which forms an angle γ of 45° or more and 135° or less with the resin extrusion direction in a closed space 13*a*. Specifically, the angle γ is, for example, 45°, 50°, 55°, 60°, 65°, 70°, 75°, 80°, 85°, 90°, 95°, 100°, 105°, 110°, 115°, 120°, 125°, 130°, or 135°, or may be between any two values presented. The angle γ is preferably 60° or more and 120° or less. As used herein, "pre-blowing" is blowing performed before molding the foam parison 13 using the split molds 14. In the second embodiment, the extrusion direction is the direction of gravity, and pre-blowing is performed by injecting air from the pre-blow nozzle 20 toward the inner surface of the foam parison 13 in the parison outer circumference direction perpendicular to the extrusion direction shown in FIGS. 8 to 11 (i.e., at an angle γ of 90°) in the closed space 13*a*. The source pressure of a gas to be pre-blown is, for example, about 0.3 bar to 7.0 bar, preferably 4.0 bar. If the source pressure is lower than the above range, the parison expansion function would not be sufficiently obtained; if the source pressure is higher than the above range, the expansion ratio would be occasionally reduced due to the internal pressure applied to the parison.

The pre-blow nozzle 20 is disposed under a die head 12 and in the approximate center of an annular slit 49. The pre-blow nozzle 20 may be configured such that the position thereof is vertically controllable, or may be disposed so as to be detachable. The pre-blow nozzle 20 may also be configured so as to rotate during air injection.
2.2. Foam Molded Article Manufacturing Method Next, a foam molded article manufacturing method according to the second embodiment of the present invention will be described.

Figure 8:
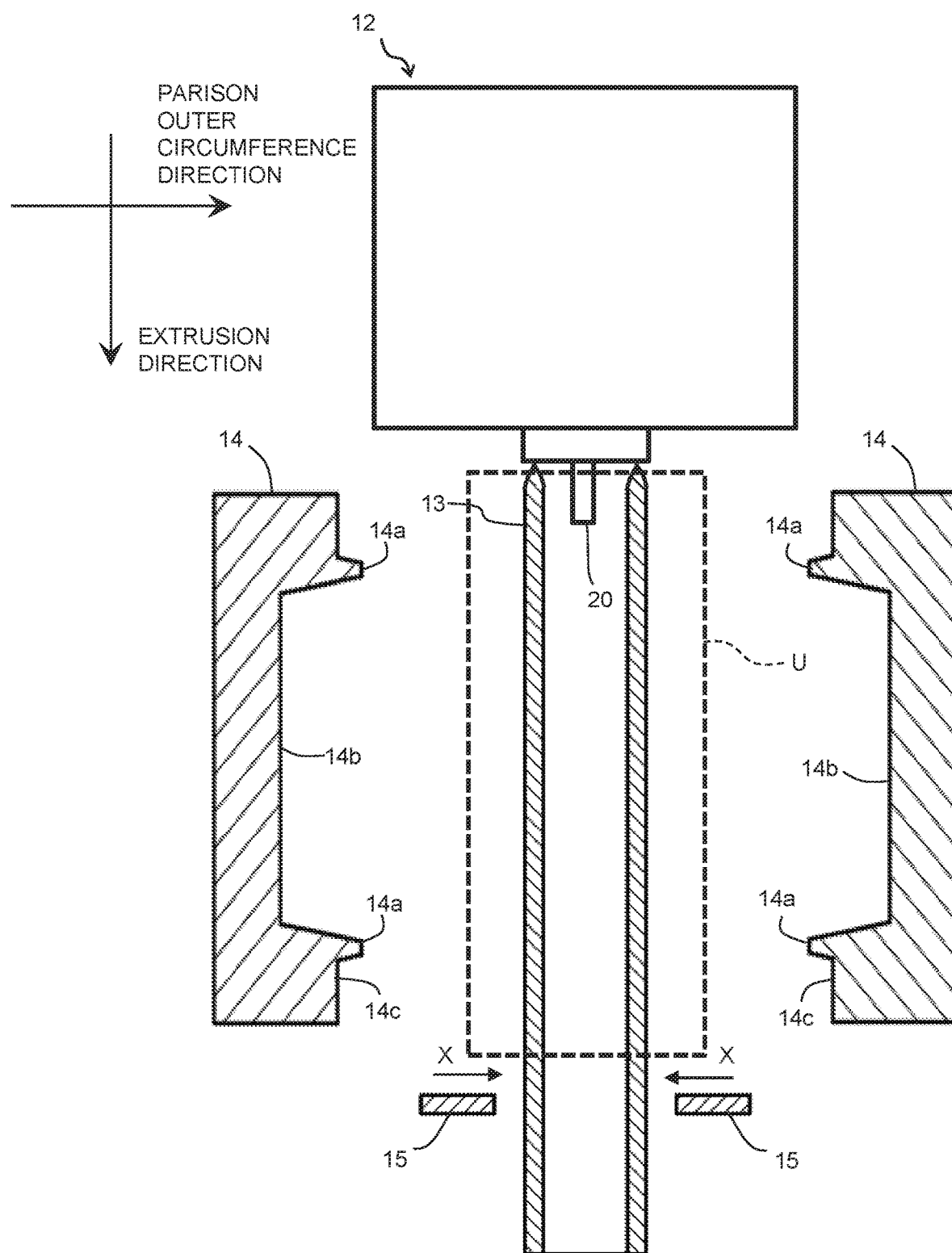
FIG. 8 is a drawing showing a state in which a foam parison 13 according to a second embodiment of the present invention has been formed.

First, as shown in FIG. 8, a molten, kneaded resin containing a foaming agent is extruded through the annular slit 49 between the die core 47 and a die shell 48 surrounding the die core 47 so as to be located in the approximately entire molding region U. Thus, a tubular (e.g., cylindrical) foam parison 13 is formed. In this parison formation step, the split molds 14 and lower pinchers 15 are open.

Figure 9:
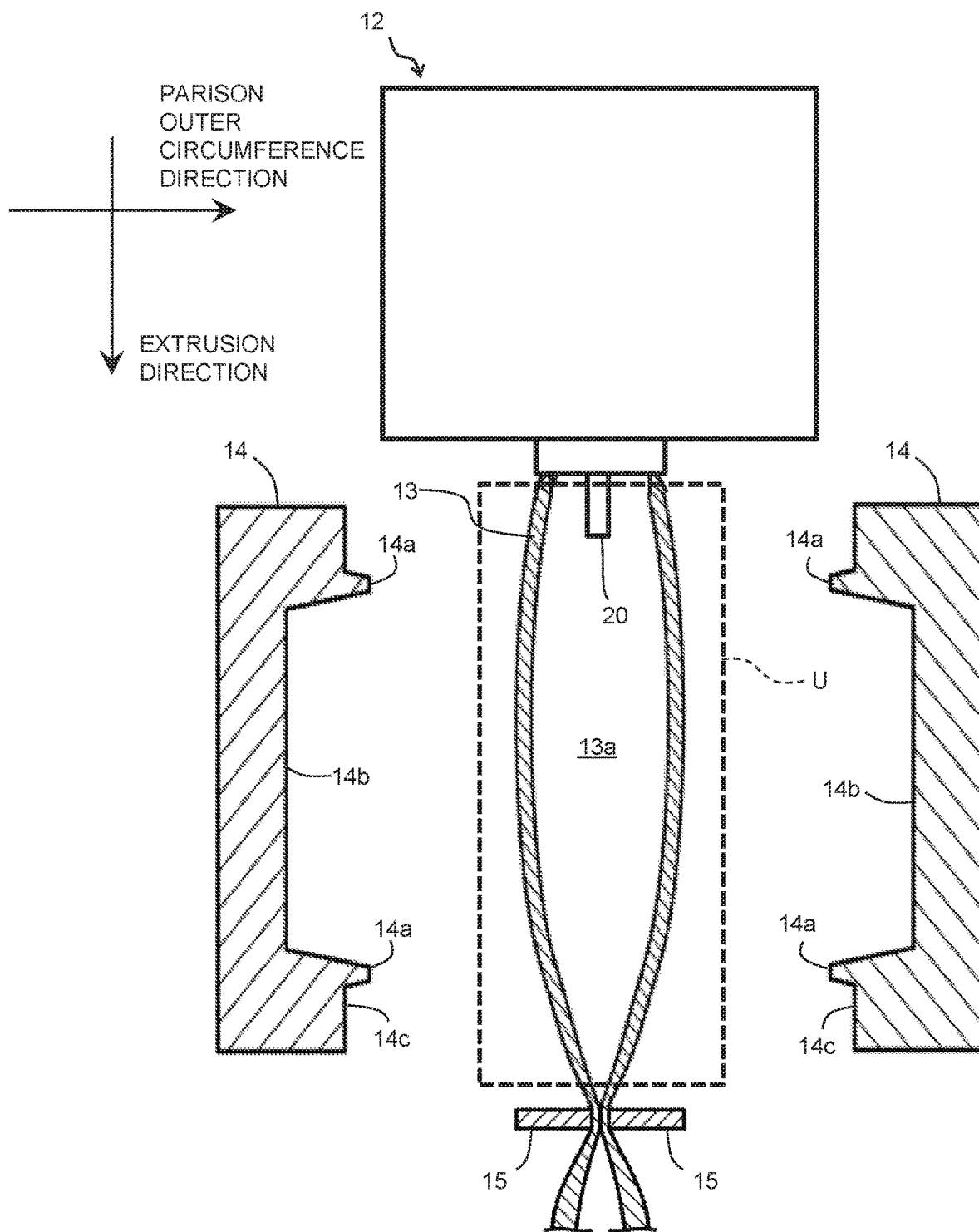
FIG. 9 is a drawing showing a state in which the foam parison 13 has been pinched between lower pinchers 15 from a state in FIG. 8.

As shown in FIGS. 8 and 9, the foam parison 13 is pinched between the lower pinchers 15 disposed under the split molds 14. Specifically, the foam parison 13 is placed in a lower-pinching state shown in FIG. 9 by moving the lower pinchers 15 in the directions of arrows X in FIG. 8. Thus, a closed space 13*a* is formed in the foam parison 13.

Figure 10:
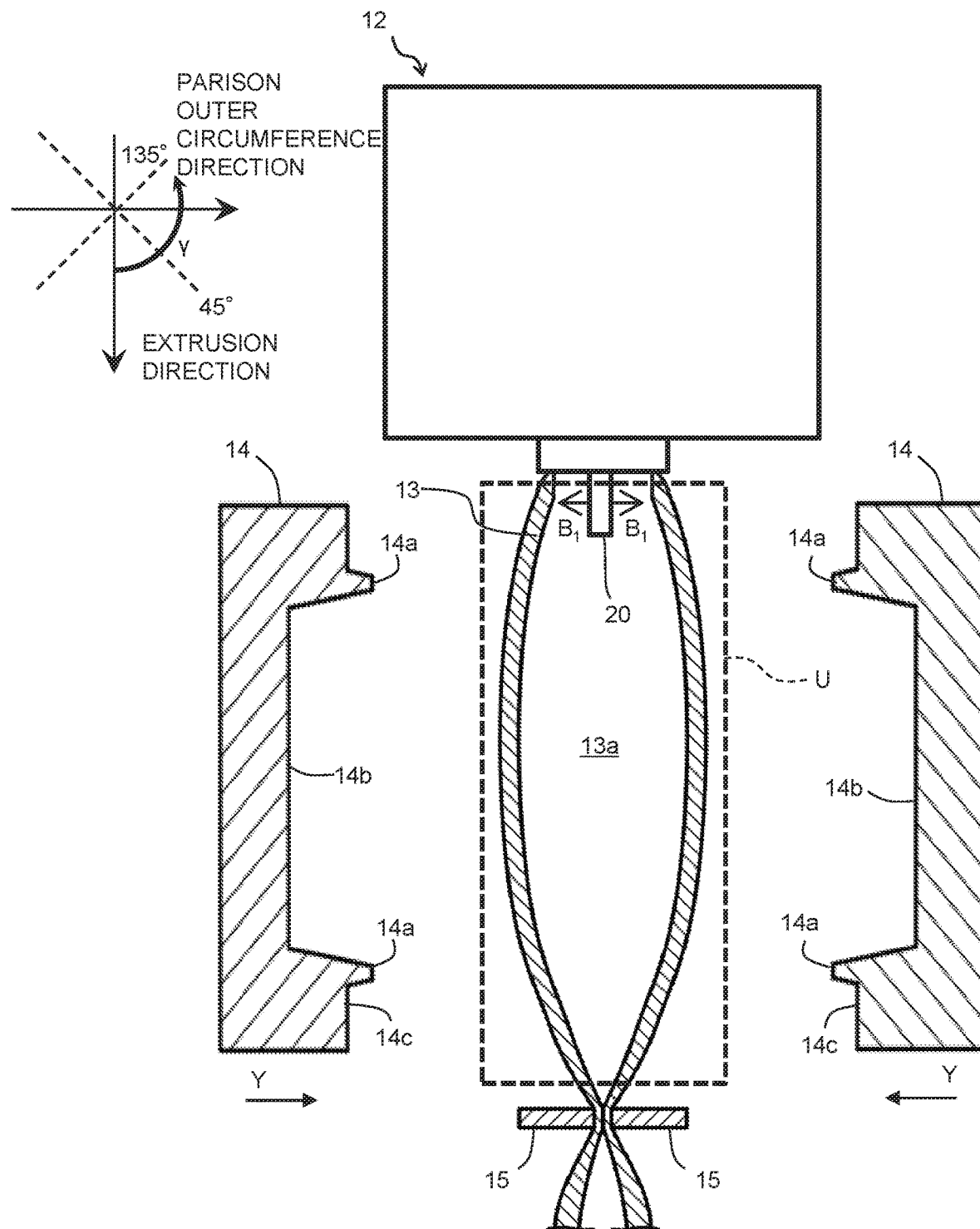
FIG. 10 is a drawing showing a state in which pre-blowing in the parison outer circumference direction has been performed from the state in FIG. 9.

Then, as shown in FIGS. 9 and 10, pre-blowing is performed by injecting air from the pre-blow nozzle 20 in the directions of arrows $B_1$ (parison outer circumference direction). In the first embodiment, the foam parison around the pre-blow nozzle may shrink, as shown in FIG. 7A. In the second embodiment, on the other hand, shrinkage of the foam parison 13 around the pre-blow nozzle 20 can be suppressed by applying pressure to the foam parison 13 in the outer circumference direction thereof so that the foam parison 13 is expanded, as shown in FIG. 10. Also, the phenomenon where the diameter of the foam parison 13 is reduced due to the effect of gravity is alleviated. Further, it is possible to suppress a curtain phenomenon that occurs on the foam parison 13 and to further reduce the incidence of a fold.

Figure 11:
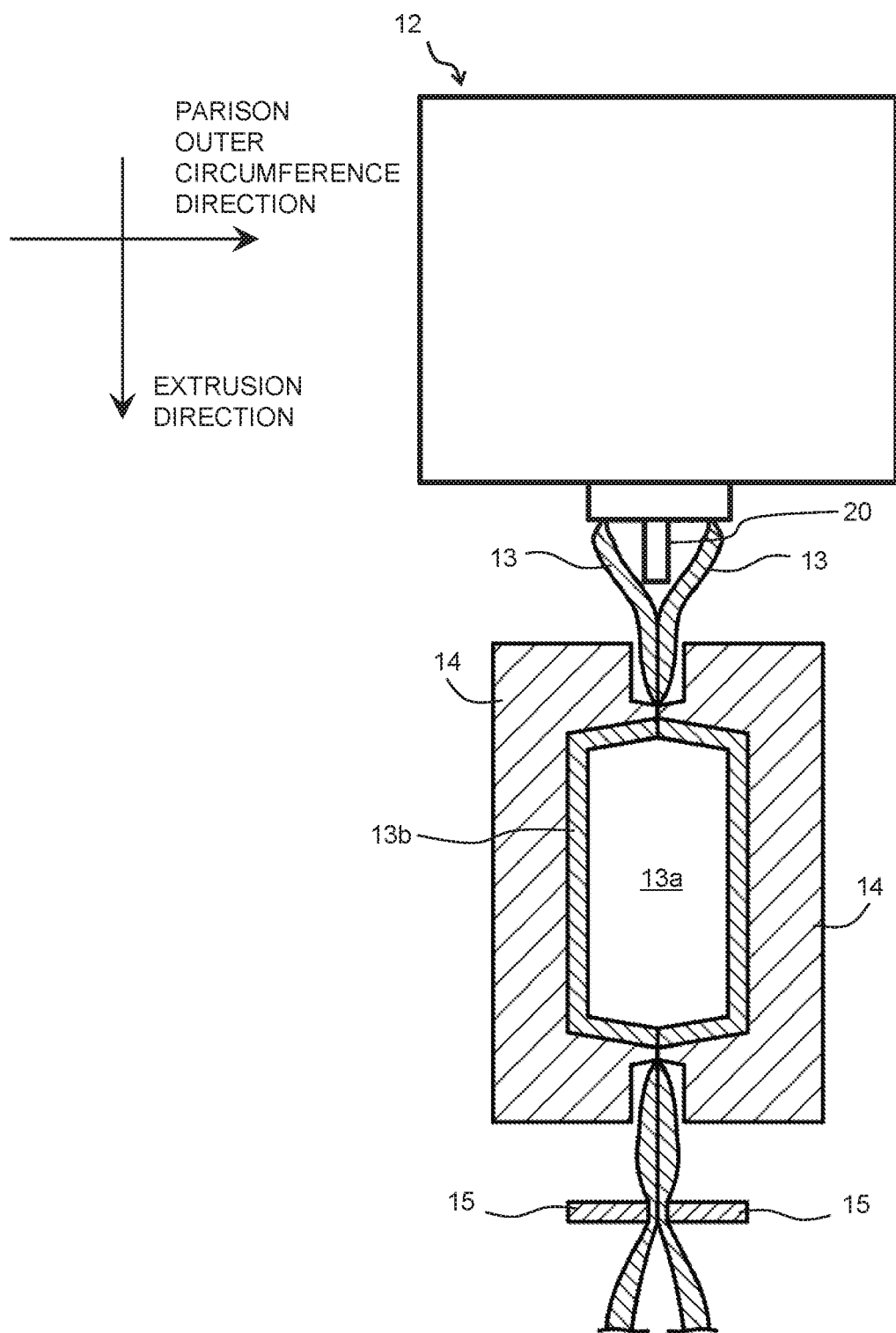
FIG. 11 is a drawing showing a state in which the split molds 14 have been closed from the state in FIG. 10.

Then, as shown in FIGS. 10 and 11, the split molds 14 are closed. Specifically, the split molds 14 are closed by moving the split molds 14 in the directions of arrows Y in FIG. 10. Then, a foam molded article 13*b* is molded by pressing the foam parison 13 against the split molds 14. Specifically, the foam molded article 13b is molded by shaping the foam parison 13 into a shape corresponding to the surfaces of the cavities 14b of the split molds 14. A method for pressing the foam parison 13 against the molds in this step may be any of blow molding, vacuum molding, and a combination thereof.

3. Third Embodiment

Figure 12:
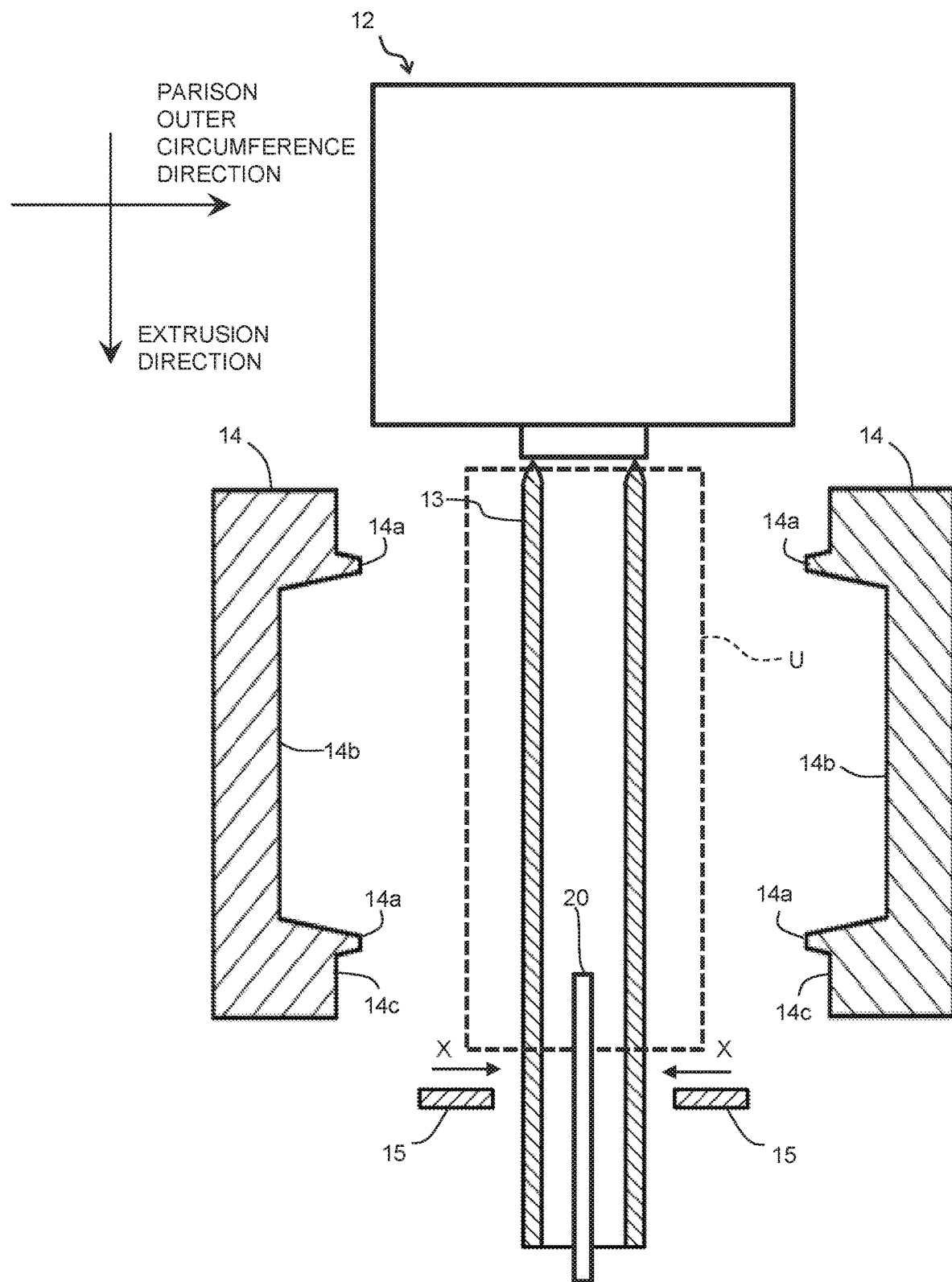
FIG. 12 is a diagram showing a third embodiment of the present invention.
Figure 13:
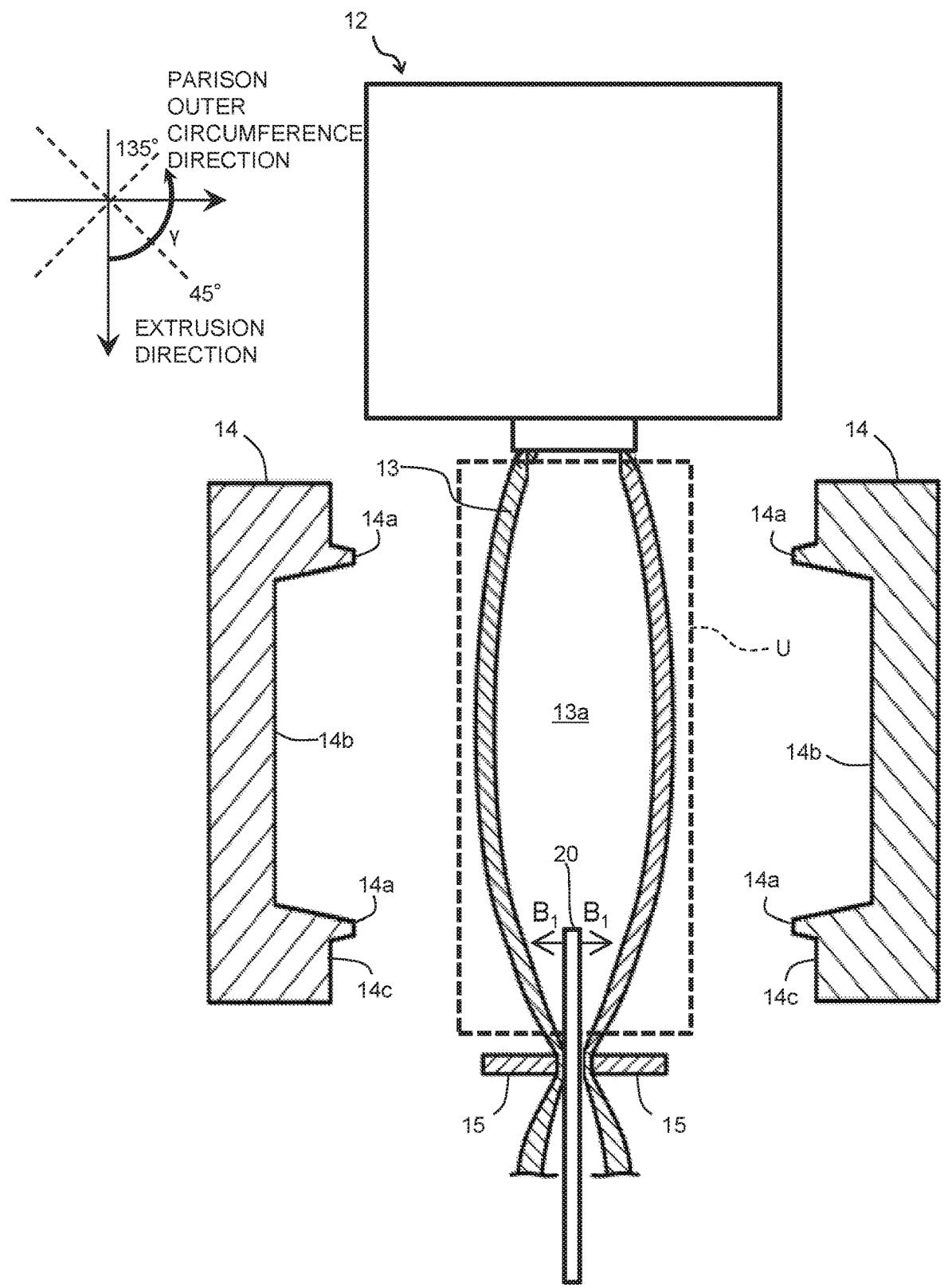
FIG. 13 is a drawing showing a state in which a foam parison 13 has been pinched between lower pinchers 15 from a state in FIG. 12.

In the second embodiment, the pre-blow nozzle 20 is disposed under the die head 12 and in the approximate center of the annular slit 49. In the third embodiment, on the other hand, a pre-blow nozzle 20 is disposed so as to extend from below lower pinchers 15, as shown in FIGS. 12 and 13. In the third embodiment also, pre-blowing is performed by injecting air from the pre-blow nozzle 20 in the directions of arrows B1. In this case, the lower pinchers 15 preferably pinch the pre-blow nozzle 20 along with the foam parison 13, as shown in FIG. 13.

In the third also, pressure is applied to the foam parison 13 in the outer circumference direction thereof, resulting in expansion of the foam parison 13, as shown in FIG. 13. Thus, shrinkage of the foam parison 13 around the pre-blow nozzle 20 can be suppressed. Also, the phenomenon where the diameter of the foam parison 13 is reduced due to the effect of gravity is alleviated. Further, a curtain phenomenon that occurs on the foam parison 13 can be suppressed, resulting in a further reduction in the incidence of a fold.

4. Fourth Embodiment

Figure 14:
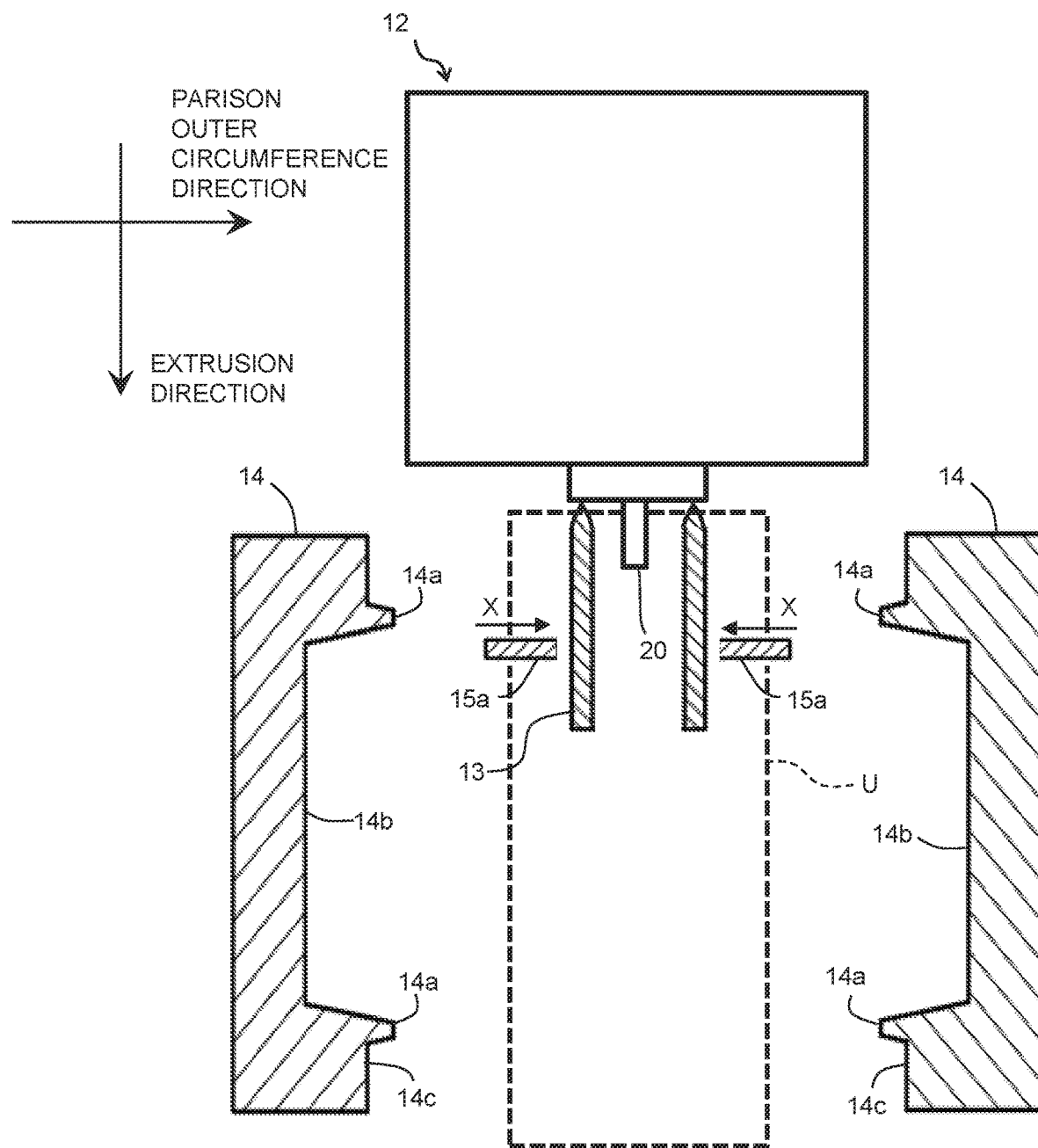
FIG. 14 is a drawing showing a fourth embodiment of the present invention.
Figure 15:
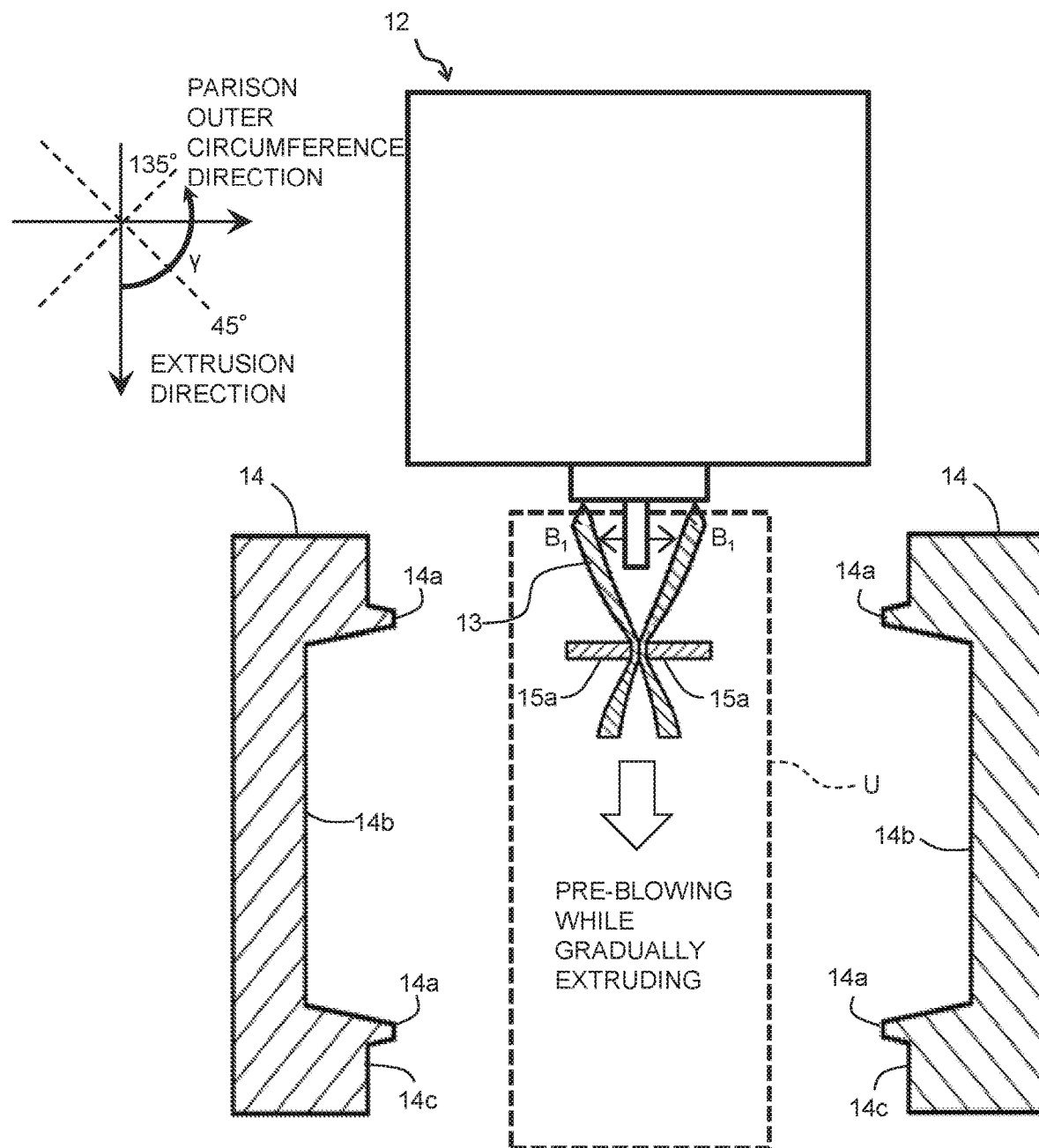
FIG. 15 is a drawing showing a state in which a foam parison 13 has been pinched between upper pinchers 15a from a state in FIG. 14.

In the first to third embodiments, the lower pinchers 15 are located under the region (molding region U) between the split molds 14, as represented by the name thereof. In the fourth embodiment, on the other hand, upper pinchers 15a are disposed in an upper portion of a molding region U (or over the molding region U, depending on the size of split molds 14) in place of lower pinchers 15, as shown in FIGS. 14 and 15. In the first to third embodiments, the foam parison 13 is located in the approximately entire region (molding region U) between the split molds 14 and then subjected to lower-pinching. In the fourth embodiment, on the other hand, pre-blowing is gradually performed in the directions of arrows $B_1$ while gradually extruding a foam parison 13. Then, at the predetermined timing when the foam parison 13 is located in the upper portion of the molding region U, upper-pinching is performed by moving the upper pinchers 15a in the directions of arrows X.

The extrusion of the foam parison 13 in a predetermined amount and pre-blowing may be alternately performed multiple times as follows: first, the foam parison 13 is extruded in a predetermined amount so that the foam parison 13 is located in the upper portion of the molding region U, as shown in FIG. 14; then, upper-pinching is performed by pinching and sealing the foam parison 13, and pre-blowing is performed, as shown in FIG. 15; and then the extrusion of the foam parison 13 and pre-blowing are each performed at least once, or, as described above, pre-blowing is gradually performed while gradually extruding the foam parison 13. Note that as the foam parison 13 is extruded, the upper pinchers 15a are extruded downward.

In other words, in the fourth embodiment, the foam parison 13 is pinched between the upper pinchers 15a and sealed before the lower end of the foam parison 13 reaches the lower end of the molding region U, and pre-blowing is performed while lowering the upper pinchers 15a as the lower end of the foam parison 13 is lowered.

In the fourth embodiment also, pressure is applied to the foam parison 13 in the outer circumference direction thereof, resulting in expansion of the foam parison 13, as shown in FIG. 15. Thus, shrinkage of the foam parison 13 around the pre-blow nozzle 20 can be suppressed. Also, the phenomenon where the diameter of the foam parison 13 is reduced due to the effect of gravity is alleviated. Further, a curtain phenomenon that occurs on the foam parison 13 can be suppressed, resulting in a further reduction in the incidence of a fold.

4.1 Modification of Fourth Embodiment

Figure 16:
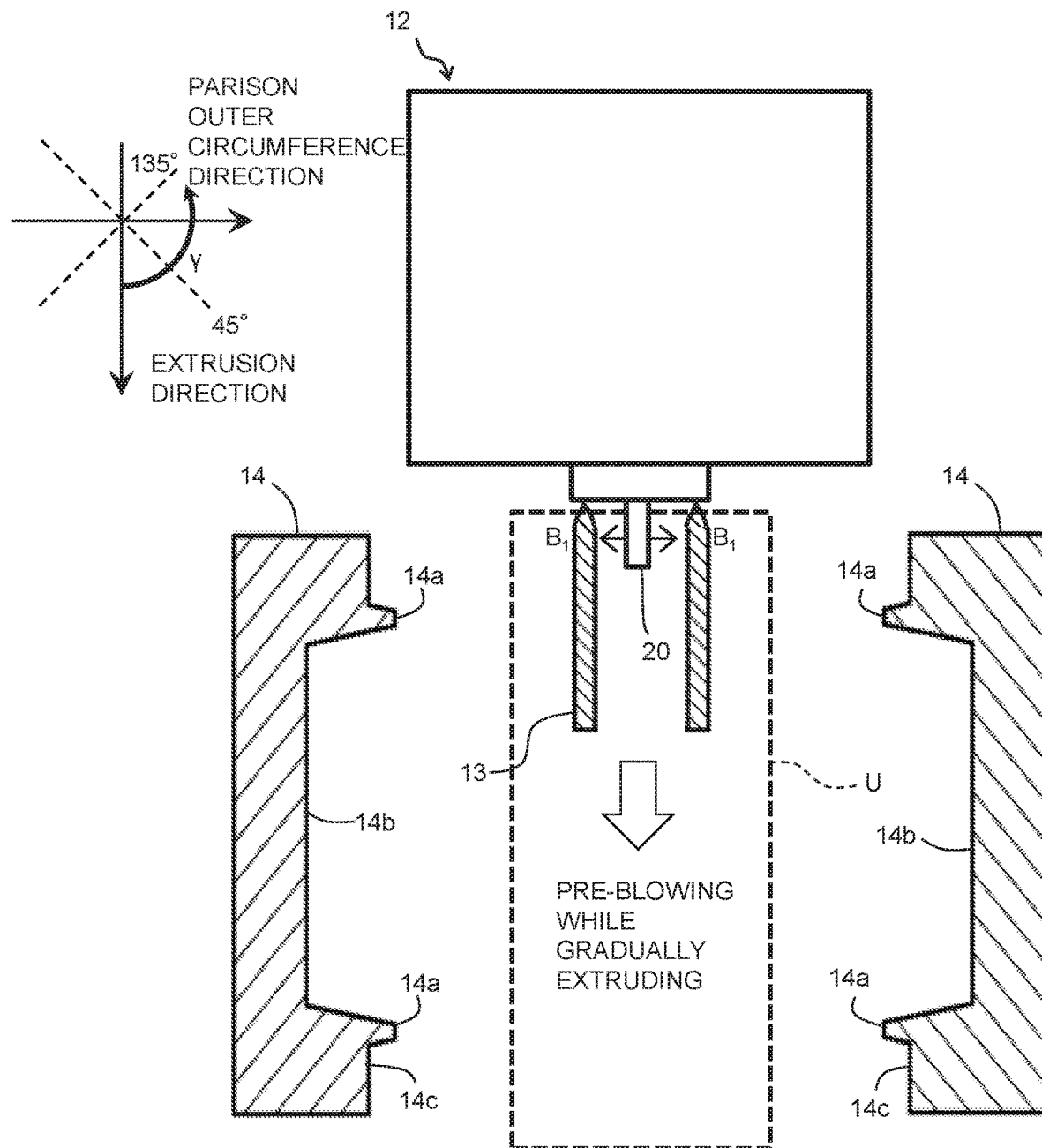
FIG. 16 is a diagram showing a modification of the fourth embodiment of the present invention.

In the fourth embodiment, upper-pinching need not be performed, as shown in FIG. 16. In this case, pre-blowing is gradually performed in the directions of arrows B1 while gradually extruding a foam parison 13, or the extrusion of the foam parison 13 in a predetermined amount and pre-blowing are alternately performed multiple times.

DESCRIPTION OF REFERENCE SIGNS

1: foam extruder
3: cylinder
5: resin inlet
7: screw
9: temperature controller
10: coupler
11: resin extrusion outlet
12: die head
13: foam parison
13a: closed space
13b: foam molded article
14: split mold
14a: pinch-off part
14b: cavity
14c: part
15: lower pincher
15a: upper pincher
16: foam molded article
17: main channel
18: sub-channel
19: junction
20: pre-blow nozzle
30: gear device
41: die case
43: mandrel
45: ring-shaped piston
46: space
47: die core
48: die shell
49: annular slit
P: foaming agent inlet
PL: parting line

The invention claimed is:

1. A method of manufacturing a foam molded article, comprising:
    an extrusion step of extruding a molten, kneaded resin containing a foaming agent through an annular slit between a die core and a die shell surrounding the die core to form a cylindrical foam parison and extruding the foam parison between a pair of split molds;
    a lower-pinching step of pinching the foam parison between lower pinchers disposed under the split molds; and
    a molding step of molding the foam parison by closing the split molds, after the lower-pinching step, wherein H/D is 1.33 to 3.33 and L/D is 0.33 to 2.00 where D represents a diameter of the die core; H represents a distance between a lower surface of the die core and an upper surface of each of the split molds; and L represents a distance between a lower surface of each of the split molds and an upper surface of the corresponding lower pincher, and wherein the diameter of the die core is between 50 mm and 300 mm, the foam molded article is a tubular object including a main channel and a sub-channel connected to the main channel, an angle between the main channel and the sub-channel is 45 to 90°, and a section which forms an angle of 0 to 45° with an extrusion direction of the foam parison, of the foam molded article has a blow ratio of 0.5 to 0.8.

2. The present invention of claim 1, wherein an expansion ratio of the foam molded article is 2.5 or more.

3. The method of claim 1, wherein the molding step comprises a step of decompressing the split molds so that the foam parison is adsorbed by the split molds, and a start timing of decompression of one of the split molds is delayed by one sec or more compared to a start timing of decompression of the other split mold.

4. The method of claim 1, wherein the extrusion step comprises controlling a thickness of the foam parison so that an area where a fold is more likely to occur, of the foam parison has a smaller thickness than a thickness of another area of the foam parison.

5. The method of manufacturing the foam molded article of claim 1, wherein the extrusion step comprises performing pre-blowing by injecting air toward an inner surface of the foam parison in a direction which forms an angle of 45° or more and 135° or less with a direction in which the molten, kneaded resin is extruded.

6. The method of manufacturing the foam molded article of claim 5, wherein the pre-blowing is performed using a pre-blow nozzle extending from above or below a region between the split molds.

7. The method of manufacturing the foam molded article of claim 5, wherein the foam parison is located in an entire region between the split molds, then lower pinching is performed by pinching and sealing the foam parison, and then the pre-blowing is performed.

* * * * *